United States Patent
Hagiwara

(10) Patent No.: US 10,208,138 B2
(45) Date of Patent: Feb. 19, 2019

(54) ORGANOSILOXANE GRAFT POLYVINYL ALCOHOL POLYMER AND METHOD OF PRODUCING THE SAME

(71) Applicant: SHIN-ETSU CHEMICAL CO., LTD., Tokyo (JP)

(72) Inventor: Mamoru Hagiwara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 23 days.

(21) Appl. No.: 15/477,318

(22) Filed: Apr. 3, 2017

(65) Prior Publication Data

US 2017/0327605 A1    Nov. 16, 2017

(30) Foreign Application Priority Data

May 12, 2016    (JP) .................... 2016-096464

(51) Int. Cl.
| | |
|---|---|
| C08F 8/42 | (2006.01) |
| C08F 116/06 | (2006.01) |
| C08G 18/62 | (2006.01) |
| C08G 18/71 | (2006.01) |
| C08F 8/12 | (2006.01) |

(52) U.S. Cl.
CPC ................. C08F 8/42 (2013.01); C08F 8/12 (2013.01); C08F 116/06 (2013.01); C08G 18/6212 (2013.01); C08G 18/718 (2013.01)

(58) Field of Classification Search
CPC .............................. C08G 18/718; C08F 116/06
See application file for complete search history.

(56) References Cited

FOREIGN PATENT DOCUMENTS

| JP | S60-170672 A | 9/1985 |
|---|---|---|
| JP | H05-53838 A | 3/1993 |
| JP | 3167892 B2 | 5/2001 |
| JP | 2011-246642 A | 12/2011 |
| WO | 2013/001313 A1 | 1/2013 |
| WO | WO 2018/008238  * | 1/2018 |

OTHER PUBLICATIONS

Arai et al., "Reason for High Solubility of Chemically Modified Poly(vinyl alcohol)s in Aqueous Solution," Macromolecules, 2015, vol. 48, pp. 1573-1578.
Oct. 20, 2017 Extended Search Report issued in European Patent Application No. 17000702.5.

* cited by examiner

*Primary Examiner* — Jeffrey C Mullis
(74) *Attorney, Agent, or Firm* — Oliff PLC

(57) ABSTRACT

An organosiloxane graft polyvinyl alcohol polymer contains a structural unit shown by the following general formula (1),

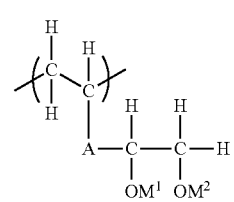

wherein $M^1$ and $M^2$ represent a hydrogen atom, an acetyl group, or a siloxane group shown by the following general formula (2), provided that at least one of $M^1$ and $M^2$ is a siloxane group shown by the general formula (2); and A represents a single bond or a linking group,

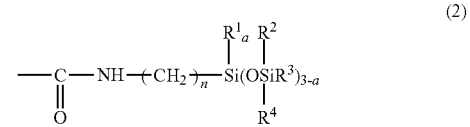

wherein $R^1$ represents a monovalent organic group having 1 to 6 carbon atoms; $R^2$, $R^3$, and $R^4$ each represent a monovalent organic group having 1 to 6 carbon atoms or a siloxy group shown by $-OSiR^5R^6R^7$, where $R^5$, $R^6$, and $R^7$ each represent a monovalent organic group having 1 to 6 carbon atoms; "n" represents an integer of 1 to 10; and "a" represents an integer of 0 to 2.

8 Claims, 1 Drawing Sheet

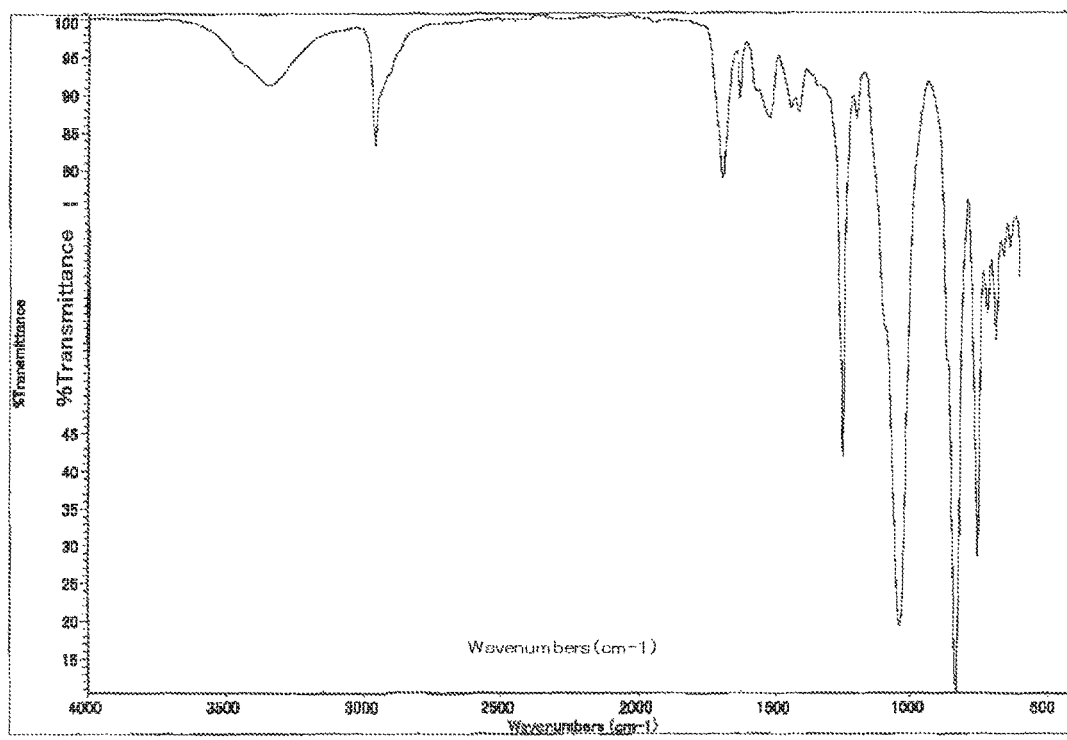

ORGANOSILOXANE GRAFT POLYVINYL ALCOHOL POLYMER AND METHOD OF PRODUCING THE SAME

TECHNICAL FIELD

The present invention relates to an organosiloxane graft polyvinyl alcohol polymer, and more particularly to a novel organosiloxane graft polyvinyl alcohol polymer and a method of producing the same.

BACKGROUND ART

Polyvinyl alcohol is a thermoplastic polymer material having excellent gas barrier property and transparency. This material, which has a relatively low glass transition temperature of about 80° C., is effective in thermoforming, and thus is widely used as raw materials of films, sheets, containers, etc. Moreover, the material coated with another resin film or sheet is often used to improve oil resistance and gas barrier property. Unfortunately, polyvinyl alcohol has poor solubility with respect to common organic solvents and is very difficult to be handled as a liquid material. Additionally, polyvinyl alcohol has low reactivity with a modifying agent for imparting additional functions. Thus, this material is difficult to be modified, and the use thereof is limited. Accordingly, it is desired to develop polyvinyl alcohol having improved solvent solubility and excellent handleability as a liquid material while keeping characteristics of polyvinyl alcohol.

To solve the problems, Patent Document 1 proposes a polymer having an alkoxy group at side chains. This polymer can improve the solubility. However, the alkoxy group bonded to Si at side chains has strong hydrolyzability, and another problem of solution stability arises. Moreover, there is no consideration for solubility with respect to silicone solvents and aliphatic hydrocarbon solvents having high safety.

Patent Document 2 proposes a polymer having a linear siloxane at side chains. This polymer can improve solubility with respect to aromatic hydrocarbon solvents such as toluene and xylene and polar solvents such as N,N-dimethyl formamide (DMF) and methyl ethyl ketone (MEK), but has poor solubility with respect to silicone solvents and aliphatic hydrocarbon solvents having high safety. Thus, the above problems are not fundamentally solved.

Patent Document 3 provides a substituted silylalkyl carbamate polyvinyl alcohol as a material that has general characteristics of polyvinyl alcohol such as film-forming property, toughness, excellent gas barrier property, and transparency as well as characteristics of silicone having a branched structure such as high solubility with respect to an organic solvent and excellent handleability as a liquid material. However, since a usual polyvinyl alcohol has low reactivity with a silicone modifying agent, an excessive amount of the silicone modifying agent is required to obtain the substituted silylalkyl carbamate polyvinyl alcohol with high modification rate, increasing the production cost. Thus, this material is unsuited for an intended use in many cases.

CITATION LIST

Patent Literature

Patent Document 1: Japanese Examined Patent publication No. H05-53838
Patent Document 2: Japanese Patent No. 3167892
Patent Document 3: Japanese Unexamined Patent publication No. 2011-246642

SUMMARY OF INVENTION

Technical Problem

The present invention was accomplished to solve the above problems. It is an object of the present invention to provide an organosiloxane graft polyvinyl alcohol polymer having general characteristics such as film-forming property and transparency as well as high solubility with respect to an organic solvent and thus excellent handleability as a liquid material.

Another object of the present invention is to provide a producing method for effectively producing the organosiloxane graft polyvinyl alcohol polymer at industrially low cost.

Solution to Problem

To achieve the above object, the present invention provides an organosiloxane graft polyvinyl alcohol polymer comprising a structural unit shown by the following general formula (1),

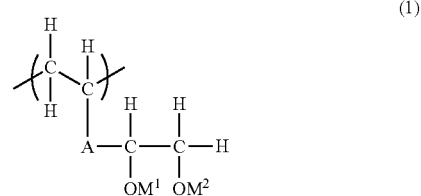

wherein $M^1$ and $M^2$ represent a hydrogen atom, an acetyl group, or a siloxane group shown by the following general formula (2), provided that at least one of $M^1$ and $M^2$ is siloxane group shown by the general formula (2); and A represents a single bond or a linking group,

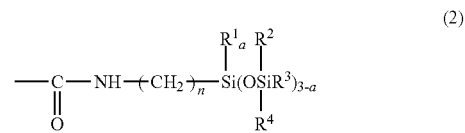

wherein $R^1$ represents a monovalent organic group having 1 to 6 carbon atoms; $R^2$, $R^3$, and $R^4$ each represent a monovalent organic group having 1 to 6 carbon atoms or a siloxy group shown by —$OSiR^5R^6R^7$, where $R^5$, $R^6$, and $R^7$ each represent a monovalent organic group having 1 to 6 carbon atoms; "n" represents an integer of 1 to 10; and "a" represents an integer of 0 to 2.

This organosiloxane graft polyvinyl alcohol polymer in which nigh crystallinity of polyvinyl alcohol is decreased, increases solubility with respect to an organic solvent and can highly react with a modifying agent. Such a polymer is an inexpensive and excellent material that has general characteristics of polyvinyl alcohol such as film-forming property and transparency as well as characteristics of silicone with a branched structure including high solubility with respect to an organic solvent and excellent handleability as a liquid material. Therefore, this polymer is useful for cosmetics, adhesives, coating materials etc.

The organosiloxane graft polyvinyl alcohol polymer preferably further comprises a structural unit shown by the following general formula (3) with a number average molecular weight (Mn) of 5,000 to 500,000 as measured by GPC in terms of polystyrene,

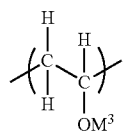  (3)

wherein $M^3$ represents a hydrogen atom, an acetyl group, or a siloxane group shown by the general formula (2).

This organosiloxane graft polyvinyl alcohol polymer more surely becomes an inexpensive and excellent material that has general characteristics of polyvinyl alcohol such as film-forming property and transparency as well as characteristics of silicone with a branched structure including high solubility with respect to an organic solvent and excellent handleability as a liquid material. In addition, this polymer has no fear of decreasing film strength, handleability, and solubility.

Preferably, in the general formula (2), "n" is 3, $R^2$, $R^3$, and $R^4$ are methyl groups, and "a" is 0.

The polymer in which "n" is 3, $R^2$, $R^3$, and $R^4$ are methyl groups, and "a" is 0 in the general formula (2) is more excellent in productivity, reactivity, and the like.

Furthermore, the present invention provides a method of producing an organosiloxane graft polyvinyl alcohol polymer, comprising reacting a polyvinyl alcohol resin compound containing a structural unit shown by the following general formula (4) with an isocyanate group-containing organopolysiloxane shown by the following general formula (5),

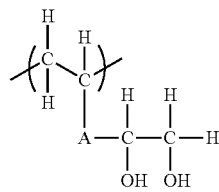  (4)

wherein A represents a single bond or a linking group,

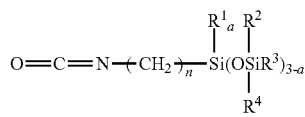  (5)

wherein $R^1$ represents a monovalent organic group having 1 to 6 carbon atoms; $R^2$, $R^3$, and $R^4$ each represent a monovalent organic group having 1 to 6 carbon atoms or a siloxy group shown by —$OSiR^5R^6R^7$, where $R^5$, $R^6$, and $R^7$ each represent a monovalent organic group having 1 to 6 carbon atoms; "n" represents an integer of 1 to 10; and "a" represents an integer of 0 to 2.

When the structural unit shown by the general formula (4) is contained in the polyvinyl alcohol resin compound used as a raw material of the organosiloxane graft polyvinyl alcohol polymer, the polyvinyl alcohol resin compound can easily dissolve in an organic solvent and can significantly improve the reaction rate with the isocyanate group-containing organopolysiloxane shown by the general formula (5). This allows the organosiloxane graft polyvinyl alcohol polymer to be effectively produced at industrially low cost.

In this method, the polyvinyl alcohol resin compound preferably further contains a structural unit shown by the following formula (6).

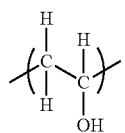  (6)

According to such a method of producing an organosiloxane graft polyvinyl alcohol polymer, isocyanate groups having high reactivity can effectively react with hydroxyl groups of the polyvinyl alcohol resin compound. Thus, the organosiloxane graft polyvinyl alcohol polymer having the structural unit shown by the general formula (1) can be easily obtained.

Additionally, the isocyanate group-containing organopolysiloxane shown by the general formula (5) is preferably tristrimethylsiloxysilylpropyl isocyanate.

When tristrimethylsiloxysilylpropyl isocyanate is used as the isocyanate group-containing organopolysiloxane shown by the general formula (5), the organosiloxane graft polyvinyl alcohol polymer with high modification rate can be effectively obtained.

Advantageous Effects of Invention

The inventive organosiloxane graft polyvinyl alcohol polymer, in which high crystallinity of polyvinyl alcohol is decreased, increases solubility with respect to an organic solvent and can highly react with a modifying agent. Such a polymer is an inexpensive material that has general characteristics of polyvinyl alcohol such as film-forming property and transparency as well as characteristics of silicone with a branched structure including high solubility with respect to an organic solvent and excellent handleability as a liquid material. Therefore, this polymer is useful for cosmetics, adhesives, coating materials, etc.

In addition, the inventive method of producing an organosiloxane graft polyvinyl alcohol polymer allows isocyanate groups having high reactivity to effectively react with hydroxyl groups of the polyvinyl alcohol resin compound. This allows the inventive organosiloxane graft polyvinyl alcohol polymer to be easily and effectively produced at industrially low cost, i.e. inexpensively.

BRIEF DESCRIPTION OF THE DRAWING

The FIGURE is a diagram showing an IR analysis result of a polymer obtained in Example 1.

DESCRIPTION OF EMBODIMENTS

As mentioned above, there is a demand of polyvinyl alcohol having improved solvent solubility and excellent handleability as a liquid material while keeping characteristics of polyvinyl alcohol.

The present inventor repeatedly and keenly conducted studies to develop siloxane-containing polyvinyl alcohol having both characteristics of polyvinyl alcohol polymer and silicone with a branched structure, and consequently found that when hydroxyl groups of a later-described polyvinyl alcohol resin compound containing a structural unit shown by the general formula (4) is brought to reaction with a later-described isocyanate group-containing organopolysiloxane shown by the general formula (5), the hydroxyl groups of the polyvinyl alcohol resin compound, which have high reactivity, effectively react with the isocyanate group-containing organopolysiloxane, and an organosiloxane graft polyvinyl alcohol polymer containing a structural unit shown by the general formula (1) can be easily and effectively obtained. Moreover, the present inventor found that the organosiloxane graft polyvinyl alcohol polymer thus obtained is novel and has general characteristics or polyvinyl alcohol such as film-forming property and transparency as well as characteristics of silicone with a branched structure including high solubility with respect to an organic solvent and excellent handleability as a liquid material, thereby bringing the present invention to completion.

That is, the present invention is an organosiloxane graft polyvinyl alcohol polymer comprising a structural unit shown by the following general formula (1),

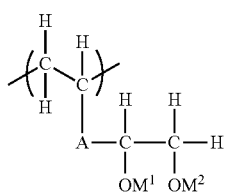

wherein $M^1$ and $M^2$ represent a hydrogen atom, an acetyl group, or a siloxane group shown by the following general formula (2), provided that at least one of $M^1$ and $M^2$ is a siloxane group shown by the general formula (2); and A represents a single bond or a linking group,

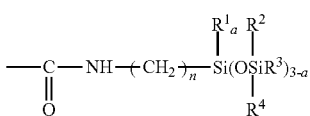

wherein $R^1$ represents a monovalent organic group having 1 to 6 carbon atoms; $R^2$, $R^3$, and $R^4$ each represent a monovalent organic group having 1 to 6 carbon atoms or a siloxy group shown by $-OSiR^5R^6R^7$, where $R^5$, $R^6$, and $R^7$ each represent a monovalent organic group having to 6 carbon atoms; "n" represents an integer of 1 to 10; and "a" represents an integer of 0 to 2.

Hereinafter, the present invention will be described in detail, but the present invention is not limited thereto.

In the present invention, tetrahydrofuran (THF) is used as a solvent of gel permeation chromatography (GPC).

[Organosiloxane Graft Polyvinyl Alcohol Polymer]

The inventive organosiloxane graft polyvinyl alcohol polymer contains a structural unit shown by the following general formula (1),

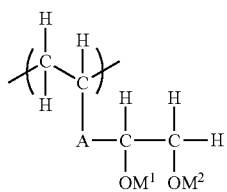

wherein $M^1$ and $M^2$ represent a hydrogen atom, an acetyl group, or a siloxane group shown by the following general formula (2), provided that at least one of $M^1$ and $M^2$ s a siloxane group shown by the general formula (2); and A represents a single bond or a linking group,

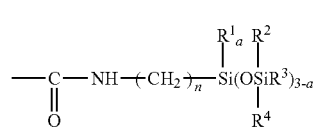

wherein $R^1$ represents a monovalent organic group having 1 to 6 carbon atoms; $R^2$, $R^3$, and $R^4$ each represent a monovalent organic group having 1 to 6 carbon atoms or a siloxy group shown by $-OSiR^5R^6R^7$, where $R^5$, $R^6$, and $R^7$ each represent a monovalent organic group having 1 to 6 carbon atoms; "n" represents an integer of 1 to 10; and "a" represents an integer of 0 to 2.

In the formulae, $R^1$, $R^2$, $R^3$, $R^4$, $R^5$, $R^6$, and $R^7$ may be a monovalent organic group having 1 to 6 carbon atoms. Illustrative examples thereof include alkyl groups such as a methyl group, an ethyl group, a propyl group, and a butyl group; cycloalkyl groups such as a cyclopentyl group and a cyclohexyl group; aryl groups such as a phenyl group; alkenyl groups such as a vinyl group and an allyl group; and substituted hydrocarbon groups such as a chloromethyl group and 3,3,3-trifluoropropyl group. $R^1$, $R^2$, $R^3$, $R^4$, $R^5$, $R^6$, and $R^7$ may be the same or different from each other. In addition, $R^2$, $R^3$, and $R^4$ may be a siloxy group shown by $-OSiR^5R^6R^7$. Illustrative examples of the siloxy group include a trimethylsiloxy group, an ethyldimethylsiloxy group, a phenyldimethylsiloxy group, a vinyldimethylsiloxy group, a chloromethyldimethylsiloxy group, and a 3 3,3-trifluoropropyldimethylsiloxy group.

In the general formula (2), "a" represents an integer of 0 to 2. Preferably, in the general formula (2), "n" is 3, $R^2$, $R^3$, and $R^4$ are methyl groups, and "a" is 0.

In the general formula (1), A represents a single bond or a linking group. A is preferably a single bond. The organosiloxane graft polyvinyl alcohol polymer in which A is a single bond is more excellent in industrial productivity.

The inventive organosiloxane graft polyvinyl alcohol polymer preferably further contains a structural unit shown by the following general formula (3) with a number average molecular weight (Mn) of 5,000 to 500,000 as measured by GPC in terms of polystyrene,

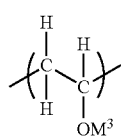

wherein M³ represents a hydrogen atom, an acetyl group, or a siloxy group shown by the general formula (2).

With respect to the molecular weight of the inventive organosiloxane graft polyvinyl alcohol polymer, the number average molecular weight (Mn) may be 5,000 to 5,000,000, preferably 5,000 to 500,000, more preferably 10,000 to 100,000, as measured by GPC using tetrahydrofuran (THF) as a solvent in terms of polystyrene. When the number average molecular weight is 5,000 or more, there is no fear of decreasing film strength. When the number average molecular weight is 500,000 or less, there is no fear of decreasing handleability and solubility.

(Method of Producing Organosiloxane Graft Polyvinyl Alcohol Polymer)

Furthermore, the present invention provides a method of producing an organosiloxane graft polyvinyl alcohol polymer. In the inventive method of producing an organosiloxane graft polyvinyl alcohol polymer, a polyvinyl alcohol resin compound containing a structural unit shown by the following general formula (4) is reacted with an isocyanate group-containing organopolysiloxane shown by the following general formula (5),

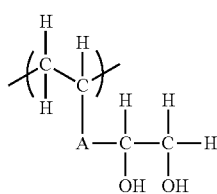
(4)

wherein A represents a single bond or a linking group,

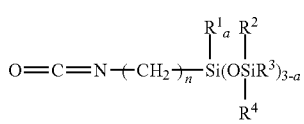
(5)

wherein R¹ represents a monovalent organic group having 1 to 6 carbon atoms; R², R³, and R⁴ each represent a monovalent organic group having 1 to 6 carbon atoms or a siloxy group shown by —OSiR⁵R⁶R⁷ where R⁵, R⁶, and R⁷ each represent a monovalent organic group having 1 to 6 carbon atoms; "n" represents an integer of 1 to 10; and "a" represents an integer of 0 to 2.

When the structural unit shown by the general formula (4) is contained in the polyvinyl alcohol resin compound used as a raw material of the organosiloxane graft polyvinyl alcohol polymer, the polyvinyl alcohol resin compound can easily dissolve in an organic solvent and can significantly improve the reaction rate with the isocyanate group-containing organopolysiloxane shown by the general formula (5).

The polyvinyl alcohol resin compound preferably further contains a structural unit shown by the following formula (6).

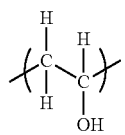
(6)

The polyvinyl alcohol resin compound containing the structural unit shown by the general formula (4) and the structural unit shown by the formula (6) can be obtained, for example, by saponifying a polyacetate vinyl resin compound containing a structural unit shown by the following general formula (7) and a structural unit shown by the following formula (8),

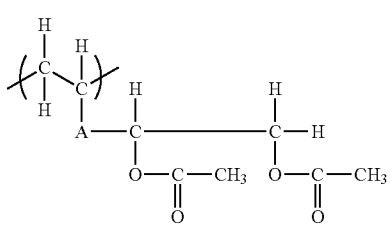
(7)

wherein A has the same meaning as above.

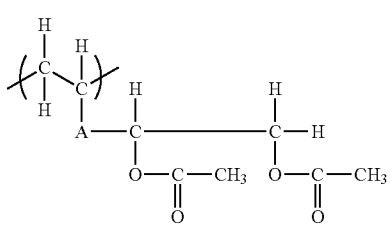
(8)

Although the polyvinyl alcohol resin compound used as a raw material of the organosiloxane graft polyvinyl alcohol polymer can be obtained by saponifying a polyacetate vinyl compound, the polyvinyl alcohol resin compound to be used may be a partially saponified compound.

In the case that a partially saponified polyvinyl alcohol resin compound is used to synthesize the organosiloxane graft polyvinyl alcohol polymer, an organosiloxane graft polyvinyl alcohol polymer containing the structural unit shown by the general formula (7) and the structural unit shown by the formula (8) can be obtained as a typical compound.

The polyacetate vinyl resin compound containing the structural unit shown by the general formula (7) and the structural unit shown by the formula (8) can be obtained by polymerizing a compound shown by the following general formula (9) and a compound shown by the following formula (10),

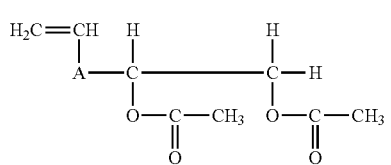
(9)

wherein A has the same meaning as above.

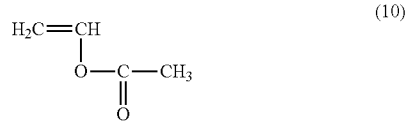

(10)

The molecular weight of the above-described polyvinyl alcohol resin compound can be appropriately selected such that the inventive organosiloxane graft polyvinyl alcohol polymer has a molecular weight (i.e. number average molecular weight (Mn) measured by CPC in terms of polystyrene) of 5,000 to 5,000,000.

The above-described polyvinyl alcohol resin compound may be a commercially product, G-Polymer™ available from Nippon Synthetic Chemical Industry Co., Ltd. More specifically, the compound may be selected from AZF8035W, OKS-6026, OKS-1011, OKS-8041, OKS-8049, OKS-1028, OKS-1027, OKS-1109, and OKS-1083.

The inventive method of producing an organosiloxane graft polyvinyl alcohol polymer is performed by reacting hydroxyl groups of the polyvinyl alcohol resin compound with the isocyanate group-containing organopolysiloxane, as described above. As the isocyanate group-containing organopolysiloxane, in particular, tristrimethylsiloxysilylpropyl isocyanate a compound of the general formula (5) in which "n" is 3, $R^2$, $R^3$, and $R^4$ are methyl groups, and "a" is 0) is preferably used. The reaction tristrimethylsiloxysilylpropyl isocyanate with the polyvinyl alcohol resin compound produces a tristrimethylsiloxysilylpropyl carbamate polyvinyl alcohol polymer having a structural unit shown by the following general formula (11),

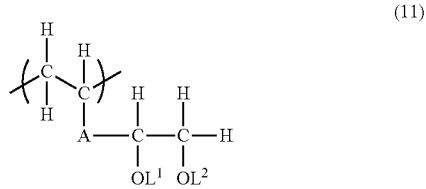

(11)

wherein $L^1$ and $L^2$ represent a hydrogen atom, an acetyl group, of a siloxane group shown by the following formula (12), provided that at least one of $L^1$ and $L^2$ is a siloxane group shown by the formula (12); and A represents a single bond or a linking group.

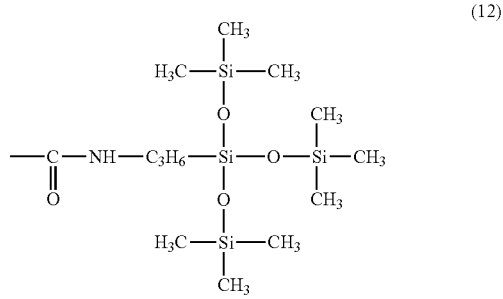

(12)

Moreover, the inventive method of producing an organosiloxane graft polyvinyl alcohol polymer is performed by reacting hydroxyl groups of the polyvinyl alcohol resin compound with the isocyanate group-containing organopolysiloxane, as described above. This polyvinyl alcohol resin compound preferably contains a polybutenediol structure (i.e. a structure of the general formula (4) in which A is a single bond). When the polybutenediol structure is contained, an organosiloxane graft polyvinyl alcohol polymer having high solubility with respect to an organic solvent and high modification rate can be effectively obtained. This polymer has a structural unit shown by the following general formula (13),

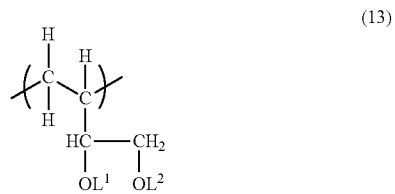

(13)

wherein $L^1$ and $L^2$ have the same meanings as above.

Since the inventive method of producing an organosiloxane graft polyvinyl alcohol polymer employs the urethane linkage reaction of hydroxyl groups of the polyvinyl alcohol resin compound with the isocyanate group-containing organopolysiloxane, a specific reaction condition and a specific reaction apparatus are not required. However, a solvent is preferably used to mix polyvinyl alcohol resin compound with the isocyanate group-containing organopolysiloxane and perform the reaction efficiently and controllably. Examples of the solvent include esters such as methyl acetate, ethyl acetate, and butyl acetate; ketones such as acetone, methyl ethyl ketone, and cyclohexanone; aromatic hydrocarbons such as toluene and xylene; ethers such as diethyl ether and tetrahydrofuran; amides such as N,N-dimethylformamide and N-methylpyrrolidone; and sulfoxides such as dimethylsulfoxide. These solvents may be used solely or in combination of two or more kinds.

Moreover, the reaction is generally performed at 20 to 150° C. for 1 to 24 hours although the conditions depend on the kind of the solvents used in the reaction. In this case, a known catalyst used for urethane linkage, including amines such as triethylamine, triethylenediamine, and N-methylmorpholine; and organic metal compounds such as di-n-butyl tin dilaurate and stannous oleate, may be added. After completion of the reaction, washing and drying may be performed to obtain the intended organosiloxane graft polyvinyl alcohol polymer.

EXAMPLE

Hereinafter, the present invention will be described in more detail with reference to examples and comparative examples, but the present invention is not limited thereto.

Example 1

A flask equipped with a dropping funnel, a cooling pipe, a thermometer, and a stirrer was charged with 20 g of G-Polymer (OKS-1011, polymerization degree 300, saponification rate 98.5%) available from Nippon Synthetic Chemical Industry Co Ltd., as the polyvinyl alcohol resin compound containing the structural unit shown by the general formula (4), 180 g of N-methylpyrrolidone, 0.6 g of triethylamine, and 52.5 g of tristrimethylsiloxysilylpropyl isocyanate, and reaction was performed at 90° C. for 4 hours. After completion of the reaction, a reaction product was precipitated in a mixed solution of water and methanol, and repeatedly washed with a mixed solution of water and methanol. The product was then dried under reduced pressure at 70° C. for 24 hours to obtain 58.0 g of a polymer. The FIGURE shows an IR analysis result of the polymer. The IR analysis result showed that the absorption of isocyanate groups at 2,270 cm$^{-1}$ almost disappeared and identified the obtained polymer as a tristrimethylsiloxysilylpropyl carbamate polyvinyl alcohol having the structural unit shown by the general formula (1). The number average molecular weight (Mn) measured by GPC using THF as a solvent was 26,000 in terms of polystyrene, and the molecular weight distribution was 1.61. Table 1 shows the solubility of the obtained polymer with respect to respective solvents. In addition, Table 2 shows results of modification rate in the reaction and appearance of a film (300 μm thick) produced by a solution casting method using an isopropanol solution in which 5 mass % of the obtained polymer has been dissolved.

Example 2

The same apparatus as in Example 1 was charged with 20 g of G-Polymer (OKS-1083, polymerization degree 1,900, saponification rate 99.8%) available from Nippon Synthetic Chemical Industry Co., Ltd., as the polyvinyl alcohol resin compound containing the structural unit shown by the general formula (4), 180 g of N-methylpyrrolidone, 0.6 g of triethylamine, and 52.5 g of tristrimethylsiloxysilyl-propyl isocyanate, and reaction was performed at 90° C. for 4 hours. After completion of the reaction, a reaction product was precipitated in a mixed solution of water and methanol, and repeatedly washed with a mixed solution of water and methanol. The product was then dried under reduced pressure at 70° C. for 24 hours to obtain 65.5 g of a polymer. The IR analysis result showed that the absorption of isocyanate groups at 2,270 cm$^{-1}$ almost disappeared and identified the obtained polymer as a tristrimethylsiloxysilylpropyl carbamate polyvinyl alcohol having the structural unit shown by the general formula (1). The number average molecular weight (Mn) measured by GPC using THF as a solvent was 68,000 in terms of polystyrene, and the molecular weight distribution was 1.23. Table 1 shows the solubility of the obtained polymer with respect to respective solvents. In addition, Table 2 shows results of modification rate in the reaction and appearance of a film (300 μm thick) produced by a solution casting method using an isopropanol solution in which 5 mass % of the obtained polymer has been dissolved.

Example 3

The same apparatus as in Example 1 was charged with 20 g of C-Polymer (OKS-1083, polymerization degree 1,900, saponification rate 99.8%) available from Nippon Synthetic Chemical Industry Co., Ltd., as the polyvinyl alcohol resin compound containing the structural unit shown by the general formula (4), 180 g of N-methylpyrrolidone, 0.6 g of triethylamine, and 105 g of tristrimethylsiloxysilyl-propyl isocyanate, and reaction was performed at 90° C. for 4 hours. After completion of the reaction, a reaction product was precipitated in a mixed solution of water and methanol, and repeatedly washed with a mixed solution of water and methanol. The product was then dried under reduced pressure at 70° C. for 24 hours to obtain 96.4 g of a polymer. The IR analysis result showed that the absorption of isocyanate groups at 2,270 cm$^{-1}$ almost disappeared and identified the obtained polymer as a tristrimethylsiloxysilylpropyl carbamate polyvinyl alcohol having the structural unit shown by the general formula (1). The number average molecular weight (Mn) measured by GPC using THF as a solvent was 135,000 in terms of polystyrene, and the molecular weight distribution was 1.59. Table 1 shows the solubility of the obtained polymer with respect to respective solvents. In addition, Table 2 shows results of modification rate in the reaction and appearance of a film (300 μm thick) produced by a solution casting method using an isopropanol solution in which 5 mass % of the obtained polymer has been dissolved.

Comparative Example 1

The same apparatus as in Example 1 was charged with 20 g of a common highly saponified POVAL (polymerization degree 550, saponification rate 98.5%) as a polyvinyl alcohol resin compound containing no structural unit shown by the general formula (4), 380 g of N-methylpyrrolidone, 0.6 g of triethylamine, and 42.0 g of tristrimethylsiloxy-silylpropyl isocyanate, and reaction was performed at 90° C. for 6 hours. After completion of the reaction, a reaction product was precipitated in a mixed solution of water and methanol, and repeatedly washed with a mixed solution of water and methanol. The product was then dried under reduced pressure at 70° C. for 24 hours to obtain 40.0 g of a polymer. The IR analysis result showed that the absorption of isocyanate groups at 2,270 cm$^{-1}$ almost disappeared and identified the obtained polymer as a tristrimethysiloxysilylpropyl carbamate polyvinyl alcohol having no structural unit shown by the general formula (1). The number average molecular weight (Mn) measured by GPC using THF as a solvent was 60,000 in terms of polystyrene, and the molecular weight distribution was 1.85. Table 1 shows the solubility of the obtained polymer with respect to respective solvents. In addition, Table 2 snows results of modification rate in the reaction and appearance of a film (300 μm thick) produced by a solution casting method using an isopropanol solution in which 5 mass % of the obtained polymer has been dissolved.

Comparative Example 2

With the same apparatus as in Example 1, 82.0 g of a polymer was obtained in the same manner as in Comparative Example 1 except that 83.4 p of tristrimethylsiloxysilyl-propyl isocyanate was used. The IR analysis result showed that the absorption of isocyanate groups at 2,270 cm$^{-1}$ almost disappeared and identified the obtained polymer as a tristrimethylsiloxysilylpropyl carbamate polyvinyl alcohol having no structural unit shown by the general formula (1). The number average molecular weight (Mn) measured by GPC using THF as a solvent was 76000 in terms of polystyrene, and the molecular weight distribution was 2.52. Table 1 shows the solubility of the obtained polymer with respect to respective solvents. In addition, Table 2 shows results of modification rate in the reaction and appearance of a (300 μm thick) produced by a solution casting method using an isopropanol solution in which 5 mass % of the obtained polymer has been dissolved.

TABLE 1

| | Solubility [1] | | | | |
|---|---|---|---|---|---|
| | Water | Methanol | Isododecane | Toluene | D5 [2] |
| G-Polymer; OKS-1011 | Good | Poor | Poor | Poor | Poor |
| G-Polymer; OKS-1083 | Good | Poor | Poor | Poor | Poor |
| Highly saponified POVAL | Good | Poor | Poor | Poor | Poor |
| Example 1 | Poor | Good | Good | Good | Good |
| Example 2 | Poor | Good | Good | Good | Good |
| Example 3 | Poor | Good | Good | Good | Good |
| Comparative Example 1 | Poor | Good | Moderate | Poor | Moderate |
| Comparative Example 2 | Poor | Good | Good | Good | Good |

[1] The solubility was evaluated by preparing a 10 mass % solution. Good: soluble, Moderate: partially soluble, Poor: insoluble
[2] D5: decamethylcyclopentasiloxane

TABLE 2

| | Modification rate (mol %) | Appearance of film |
|---|---|---|
| Example 1 | 29.4 | transparent |
| Example 2 | 29.4 | transparent |
| Example 3 | 49.8 | transparent |
| Comparative Example 1 | 23.0 | semi-transparent |
| Comparative Example 2 | 43.0 | semi-transparent |

As shown in Table 1 and Table 2, Examples 1 to 3 could provide the inventive organosiloxane graft polyvinyl alcohol polymer having the structural unit shown by the general formula (1) by effective reaction with a small amount of the silicone modifying agent. The obtained polymer had excellent solubility with respect to an organic solvent, transparency, and film-forming property, i.e. coating property.

By contrast, Comparative Example 1 having no structural unit shown by the general formula (1) had low solubility with respect to isododecane and decamethylcyclopentasiloxane and was insoluble in toluene. In addition, the films produced by Comparative Examples 1 and 2 having no structural unit shown by the general formula (1) were inferior in transparency.

The above results demonstrate that the inventive organosiloxane graft polyvinyl alcohol polymer has general characteristics of polyvinyl alcohol such as film-forming property and transparency as well as characteristics of silicone with a branched structure including high solubility with respect to an organic solvent and excellent handleability as a liquid material, and that this polymer can be produced at low cost.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

What is claimed is:

1. An organosiloxane graft polyvinyl alcohol polymer comprising a structural unit shown by the following general formula (1),

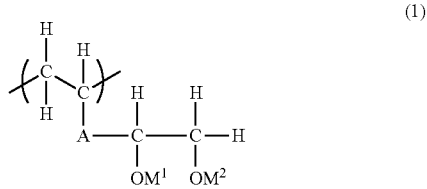

wherein $M^1$ and $M^2$ represent a hydrogen atom, an acetyl group, or a siloxane group shown by the following general formula (2), provided that at least one of $M^1$ and $M^2$ is a siloxane group shown by the general formula (2); and A represents a single bond or a linking group,

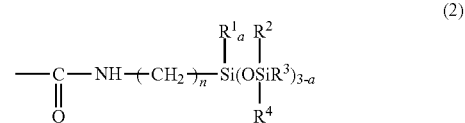

wherein $R^1$ represents a monovalent organic group having 1 to 6 carbon atoms; $R^2$, $R^3$, and $R^4$ each represent a monovalent organic group having 1 to 6 carbon atoms or a siloxy group shown by $-OSiR^5R^6R^7$, where $R^5$, $R^6$, and $R^7$ each represent a monovalent organic group having 1 to 6 carbon atoms; "n" represents an integer of 1 to 10; and "a" represents an integer of 0 to 2.

2. The organosiloxane graft polyvinyl alcohol polymer according to claim 1, further comprising a structural unit shown by the following general formula (3) with a number average molecular weight (Mn) of 5,000 to 500,000 as measured by GPC in terms of polystyrene,

wherein $M^3$ represents a hydrogen atom, an acetyl group, or a siloxane group shown by the general formula (2).

3. The organosiloxane graft polyvinyl alcohol polymer according to claim 1, wherein in the general formula (2), "n" is 3, $R^2$, $R^3$, and $R^4$ are methyl groups, and "a" is 0.

4. The organosiloxane graft polyvinyl alcohol polymer according to claim 2, wherein in the general formula (2), "n" is 3, $R^2$, $R^3$, and $R^4$ are methyl groups, and "a" is 0.

5. A method of producing an organosiloxane graft polyvinyl alcohol polymer, comprising reacting a polyvinyl alcohol resin compound containing a structural unit shown by the following general formula (4) with an isocyanate group-containing organopolysiloxane shown by the following general formula (5),

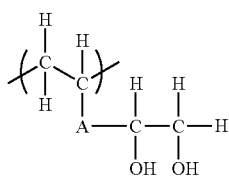
(4)

wherein A represents a single bond or a linking group,

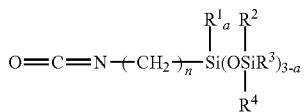
(5)

wherein $R^1$ represents a monovalent organic group having 1 to 6 carbon atoms; $R^2$, $R^3$, and $R^4$ each represent a monovalent organic group having 1 to 6 carbon atoms or a siloxy group shown by $-OSiR^5R^6R^7$, where $R^5$, $R^6$, and $R^7$ each represent a monovalent organic group having 1 to 6 carbon atoms; "n" represents an integer of 1 to 10; and "a" represents an integer of 0 to 2.

6. The method of producing an organosiloxane graft polyvinyl alcohol polymer according to claim 5, wherein the polyvinyl alcohol resin compound further contains a structural unit shown by the following formula (6).

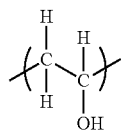
(6)

7. The method of producing an organosiloxane graft polyvinyl alcohol polymer according to claim 5, wherein the isocyanate group-containing organopolysiloxane shown by the general formula (5) is tristrimethylsiloxysilylpropyl isocyanate.

8. The method of producing an organosiloxane graft polyvinyl alcohol polymer according to claim 6, wherein the isocyanate group-containing organopolysiloxane shown by the general formula (5) is tristrimethylsiloxysilylpropyl isocyanate.

* * * * *